3,133,043
COMPOSITION COMPRISING HALOGEN-CONTAINING RESIN AND A DIPHOSPHITE STABILIZER
William J. Rosenfelder, Elmhurst, N.Y., and Edward Breznak, West Paterson, N.J., assignors to Rosett Chemicals Incorporated, Newark, N.J., a corporation of New Jersey
No Drawing. Filed Sept. 15, 1960, Ser. No. 56,128
15 Claims. (Cl. 260—45.8)

This invention relates to the stabilization of halogen containing resin compositions. In a more specific aspect the invention relates to imparting greater heat stability to vinyl chloride resins.

Numerous materials have been suggested for incorporation in halogen containing resins to prevent or minimize deterioration upon exposure to elevated temperatures. Some of these materials have been partially successful but there still is room for improvement. Thus while Leistner et al. Patents 2,716,092 and 2,564,646 disclose vinyl chloride resin compositions having some improvement in heat stability, these compositions suffer from the disadvantages that the initial clarity of the Leistner et al. compositions is not as great as is desired. Furthermore, it is also desirable to prolong the heat stability of the resin beyond that which can be accomplished by the Leistner et al. compositions.

An object of the present invention is to prepare halogen containing resin compositions having improved resistance to deterioration or aging.

A further object is to prepare vinyl chloride resins having a more prolonged stability at elevated temperatures.

A further object is to prepare stabilized vinyl chloride resin compositions having greater initial clarity, particularly under heat.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing certain bis heterocyclic phosphites for stabilizing halongen containing resins, preferably vinyl chloride resins.

The bis heterocyclic phosphites employed in the invention have the formula:

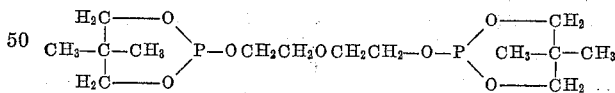

where $R_1$, $R_2$, $R_3$, $R_4$, $R_5$ and $R_6$ are selected from the group consisting of hydrogen and lower alkyl groups and Z is selected from the group consisting of —CH$_2$CH$_2$SCH$_2$CH$_2$O—, —CH$_2$CH$_2$S CH$_2$CH$_2$O—
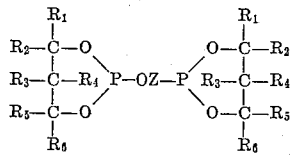

(—CH$_2$CH$_2$O—)$_x$ and (—CHCH$_2$O—)$_x$
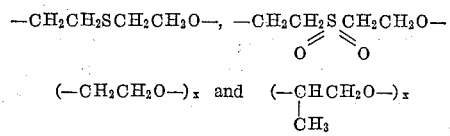

where x is an integer of at least 2. Thus, the compounds used as stabilizers have two six membered heterocylic rings (dioxaphosphorinane rings) separated by an ether, thioether or sulfonyl containing bridge.

While the bis dioxaphosphorinanes can be used alone as the stabilizer for the halogen containing resin preferably there are also employed conventional metal salt stabilizers. It has been found that there is a synergistic effect when the bis phosphorinanes are employed together with the metal salt stabilizers in stabilzing the halogen containing resins. It has also been found that the inclusions of the bis dioxaphosphorinanes, particularly those having an ether linkage, improves the stabilizing properties for halogen containing resins of compositions containing alkyl, aryl and aralkyl phosphites.

The bis dioxaphosphorinanes utilized in the present invention can be prepared by transesterifying a 1,3 glycol with triphenyl phosphite in the mol ratio of 1 to 1 to form the 2-phenoxy 1,3,2-dioxaphosphorinane and then transesterifying two mols of the latter material with 1 mol of a polyethylene glycol, polyoxypropylene glycol, thiodiglycol or sulfonyldiglycol to form the compounds employed as stabilizers. Thus, the transesterification can be carried out with a sodium phenate or alcoholate catalyst as shown in Hechenbleikner Patents 2,834,798 and 2,841,608 and French Patent 1,202,184.

It will be observed that the compounds employed in the present invention have six membered rings rather than five membered rings and that they also employ a chalcogen atom, i.e. either sulfur or oxygen as an essential component of the bridge between the two heterocyclic rings. The preferred procedure for preparing the stabilizers of the present invention employs the novel Lester Fiedman-Henry Gould type of catalyst, e.g. diphenyl phosphite.

In a specific example utilizing this preferred procedure 2 mols of 2,2-dimethyl 1,3-propanediol (neopentyl glycol) and 2 mols of triphenyl phosphite were heated with 0.25% of diphenyl phosphite based on the weight of the triphenyl phosphite. The phenol formed was distilled off at 15 mm. until 4 mols of phenol had been removed. Then 1 mol of diethylene glycol was added to the pot and distillation continued at 15 mm. until a pot temperature of 180° C. was reached, insuring the removal of all the phenol. The residue in the pot was the desired diethylene glycol dineopentylene diphosphite [β,β'-oxy-bis-(2-ethyl-5,5-dimethyl-1,3,2-dioxaphosphorinane)] having the formula:

$$\begin{array}{c} H_2C\text{---}O \\ CH_3\text{---}C\text{---}CH_3 \\ H_2C\text{---}O \end{array} P\text{---}O\ CH_2CH_2O\ CH_2CH_2\text{---}O\text{---}P \begin{array}{c} O\text{---}CH_2 \\ CH_3\text{---}C\text{---}CH_3 \\ O\text{---}CH_2 \end{array}$$

By substituting other 1,3 glycols for the neopentyl glycol there can be prepared other bis dioxaphosphorinanes. As examples of such glycols there can be used trimethylene glycol, 1,3-butylene glycol, 2-methyl-2,4-pentanediol (hexylene glycol), 2-ethyl-1,3-hexanediol; 2,4-pentanediol; 2-methyl-1,3-pentanediol; 2,4-heptanediol; 2,2-diethyl-1,3-propanediol; 2-ethyl-2-n-butyl-1,3-propanediol, and 2-methyl-2-ethyl-1,3-propanediol (neohexylene glycol).

The products can also be varied by substituting for the diethylene glycol other ether glycols such as triethylene glycol, tetraethylene glycol, Carbowax 525 (polyethylene glycol average molecule weight 525), Carbowax 725 (polyethylene glycol average molecular weight 725), Carbowax 4000 (polyethylene glycol average molecular weight 4000), dipropylene glycol, tripropylene glycol, polypropylene glycol with an average molecular weight of 525. Also there can be used thiodiglycol and sulfonyl diglycol.

As additional examples of suitable bis dioxaphosphorinanes which can be utilized as stabilizers according to the invention, there are included triethylene glycol dineopentylene diphosphite, diethylene glycol dihexylene diphosphite (diethylene glycol di 2-methyl-2,4-pentylene diphosphite), diethylene ditrimethylene diphosphite, diethylene glycol di 1,3-butylene diphosphite, diethylene glycol di (2-ethyl-1,3-hexylene) disphosphite, diethylene glycol di 2,4-pentylene diphosphite, diethylene glycol di (2-methyl-1,3-pentylene) diphosphite, diethylene glycol di 2,4-heptylene diphosphite, diethylene glycol di (2,2-diethyl-1,3-propylene) disphosphite, diethylene glycol di (-2 ethyl-2-n-butyl-1,3-propylene) diphosphite, triethylene glycol dihexylene disphosphite, triethylene glycol ditrimethylene diphosphite, triethylene glycol di (-2 ethyl-2-n-butyl-1,3-propylene) diphosphite, polyethylene glycol (molecular weight 525) dineopentylene diphosphite, polyethylene glycol (molecular weight 725) dihexylene diphosphite, polyethylene glycol (molecular weight 725) dineopentylene diphosphite, dipropylene glycol dineopentylene diphosphite, dipropylene glycol dihexylene diphosphite, tripropylene glycol dineopentylene diphosphite, thiodiglycol dineopentylene diphosphite, thiodiglycol dihexylene diphosphite, sulfonyldiglycol dihexylene diphosphite, polypropylene glycol (average molecular weight 725) dineopentylene diphosphite and diethylene glycol dineohexylene glycol diphosphite.

As the halogen containing resin there can be used resins made from vinylidene compounds such as, vinyl chloride, vinylidene chloride, vinyl chloroacetate, chlorostyrenes, vinyl bromide, chlorobutadienes.

Such vinylidene compounds may be polymerized alone or in a mixture with each other or with vinylidene compounds free from halogen. Among the halogen free materials which can be copolymerized with the halogen containing vinylidene compounds are vinyl esters of carboxylic acids, e.g., vinyl acetate, vinyl propionate, vinyl butyrate and, vinyl benzoate, esters of unsaturated acids, e.g., alkyl acrylates such as methyl acrylate, ethyl acrylate, propyl acrylate, butyl acrylate and allyl acrylate as well as the corresponding methacrylates, e.g., methyl methacrylate and butyl methacrylate, vinyl aromatic compounds, e.g., styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide, unsaturated nitriles such as acrylonitrile and the esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which a predominant portion, i.e., more than 50%, of the copolymer is made from a halogen containing vinylidene compound such as vinyl chloride represents a preferred class of polymers to be treated according to the invention.

The stabilizers of the present invention are also effective when intimately mixed with halogen containing resins in which part or all of the halogen is introduced into a preformed resin, e.g., chlorinated polyvinyl acetate, chlorinated polystyrene, chlorinated polyethylene, chlorinated polyvinyl chloride, chlorinated natural and synthetic rubbers, rubber hydrochloride.

The stabilizers of the invention are effective in halogen containing resins containing chlorine, bromine, fluorine or iodine. Preferably the halogen in the resin in chlorine.

The halogen containing resins may contain a varying proportion of halogen depending on the nature of the resin and its intended use. However, as indicated above, vinyl chloride polymers in which the proportion of vinyl chloride units amount to 50% or more of the total monomer used in making the polymer represents a preferred class of polymers to be stabilized according to the invention.

The resin, e.g., polyvinyl chloride, can either be plasticized or unplasticized. As the plasticizer there can be employed conventional materials such as dioctyl phthalate, octyl decyl phthalate, tricresyl phosphate, 2-ethylhexyl phenyl phosphate, dodecyl dicresyl phosphate, tributyl acetyl citrate, dioctyl sebacate, etc. The plasticizer is used in conventional amount, e.g., 10 to 100 parts for each 100 parts by weight of the vinyl chloride-containing resin.

The bis dioxaphosphorinanes are used in an amount of 0.1 to 10 parts per 100 parts by weight of the halogen containing resin. Preferably at least 0.5 part of the bis dioxaphosphorinane, e.g. diethylene glycol dineopentylene disphosphite, are employed.

As the metal salt stabilizer there can be employed any of the metal salts which are conventionally employed as stabilizers for halogen containing resins. Thus, there can be used barium, strontium, calcium, cadmium, zinc, lead, tin, aluminum, beryllium, magnesium, titanium, zirconium, bismuth, cobalt and nickel salts of phenols, aromatic carboxylic acids, fatty acids and epoxy fatty acids.

Examples of suitable salts of phenols include barium di (nonylphenolate), strontium di (nonylphenolate), strontium di (amylphenolate), barium di (octylphenolate), strontium di (octylphenolate), barium di (nonyl-o-cresolate), strontium di (nonyl-o-cresolate), barium di (butylphenolate), barium di (hexylphenolate), strontium di (hexylphenolate), barium di (olelphenolate), barium di (laurylphenolate), calcium di (octylphenolate), cadmium di (hexylphenolate), cadmium di (octylphenolate), cadmium di (nonylphenolate), zinc di (nonylphenolate), lead di (octylphenolate), tin tetra (nonylphenolate), aluminum tri (octylphenolate), beryllium di (octylphenolate), magnesium di (octylphenolate), titanium tetra (octylphenolate), zirconium tetra (nonylphenolate). Other suitable polyvalent metal phenolates are disclosed in Mack Patent 2,935,491.

Examples of suitable polyvalent metal salts of fatty acids are cadmium 2-ethyl-hexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate and cadmium naphthenate. There can also be used mixed salts such as phenoxy lead stearate, nonylphenoxy lead stearate, nonylphenoxy barium stearate. Such mixed salts can be prepared as described in Staley Patent 2,340,151.

As the salts of aromatic carboxylic acids there can be used cadmium benzoate, cadmium (p-tert. butyl-benzoate), barium toluate, strontium p-butylbenzoate, strontium allylbenzoate, stannous 2-methyl-4-isopropylbenzoate, cadmium p-cyclohexylbenzoate, calcium toluate and the other salts of aromatic carboxylic acids disclosed in Bradley Patent 2,598,496 and Mack Patent 2,935,491 as well as lead octyl salicylate, lead octadecyl salicylate, calcium diisopropyl salicylate, barium octadecyl salicylate, calcium octyl salicylate and other alkyl salicylates such as those disclosed in Garner Patent 2,481,307.

As examples of metal salts of epoxy fatty acids there can be used cadmium epoxy stearate, strontium epoxy stearate, lead epoxy stearate, cadmium salt of epoxidized acids of soybean oil and the other salts of epoxy fatty acids set forth in Greenspan Patent 2,684,353.

The metal salt stabilizers are used in an amount of 0.1 to 10 parts per 100 parts by weight of halogen containing resin.

In plastisol formulations there is preferably also included from 0.1 to 10 parts per 100 parts of an epoxy vegetable oil such as epoxidized soybean oil or epoxidized tall oil.

When an alkyl, aryl or aralkyl phosphite is present it is employed in an amount of 0.1 to 10 parts per 100 parts of resin. Typical of phosphites of this class are triphenyl phosphite, tridecyl phosphite, decyl diphenyl phosphite, tri-(o-xenyl)phosphite, di (p-tert. butylphenyl) phenyl phosphite, diphenyl oc-resyl phosphite, trioctyl phosphite, tricresyl phosphite, tridodecyl phosphite and tribenzyl phosphite.

Unless otherwise stated all parts and percentages in the present specification and claims are by weight.

Example 1

There were mixed together 101.1 parts of barium octyl phenate, 77.8 parts of cadmium octoate and 17.3 parts of diethylene glycol dineopentylene diphosphite. This mixture is hereinafter identified as stabilizer A and has 1.5% phosphorus.

Example 2

Example 1 was repeated but replacing the 17.3 parts of diethylene glycol dineopentylene diphosphite by 19.9 parts of triethylene glycol dineopentylene diphosphite of the formula:

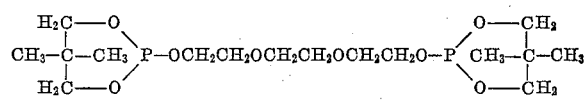

This mixture is hereinafter identified as stabilizer B and has 1.5% phosphorus.

Example 3

Example 1 was repeated but replacing the 17.3 parts of diethylene glycol dineopentylene glycol diphosphite by 18.5 parts of diethylene glycol dihexylene glycol diphosphite of the formula:

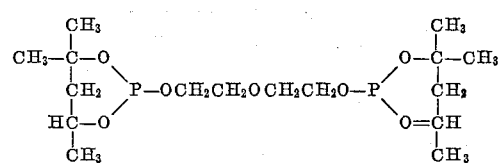

This mixture is hereinafter identified as stabilizer C and has 1.5% phosphorus.

Example 4

Example 1 was repeated but replacing the 17.3 parts of diethylene glycol dineopentylene glycol diphosphite by 21.5 parts of triethylene glycol dihexylene glycol diphosphite of the formula:

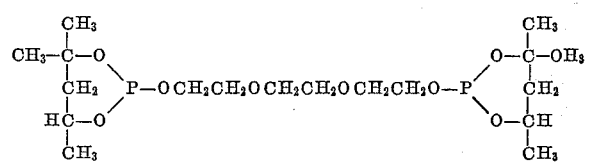

This mixture is hereinafter identified as stabilizer D and has 1.5% phosphorus.

Example 5

There was prepared a base formulation containing 100 parts of polyvinyl chloride resin (Geon 101), 30 parts dioctyl phthalate, 6 parts tricresyl phosphate, 5 parts dodecyl benzene (extender), 3 parts epoxidized soybean oil and 0.5 part stearic acid. Into separate samples of this formula there were milled in 4 parts of stabilizer A, stabilizer B, stabilizer C, stabilizer D and stabilizer M at 330° F. for 5 minutes to form sheets 45 mils thick (stabilizer M is a commercially available phosphite type stabilizer). The control sample with stabilizer M showed definite breakdown as illustrated by a light yellow color after 120 minutes at 350° F., while the samples containing stabilizers A, B, C and D were still clear and water white. The samples containing stabilizers A, B, C and D all had superior initial clarity to the sample containing stabilizer M.

Example 6

This example is directed to the preparation of plastisol formulations. The plastisol type resin employed was Geon 121, a polyvinyl chloride resin.

| | Parts |
|---|---|
| Polyvinyl chloride | 100 |
| Dioctyl phthalate | 55 |
| Epoxidized tall oil ester | 5 |
| Calcium carbonate | 10 |
| Stabilizer | 3 |
| Added compound | 2 |

The separate samples were formulated into films and heated to 375° F. The sample containing stabilizer A as the stabilizer and pure diethylene glycol dineopentylene diphosphite as the added compound was perfectly white after 30 minutes at 375° F. Similar results were obtained when stabilizers B, C and D were substituted for stabilizer A in the formulation. Good results were also obtained when pure triethylene glycol dineopentylene diphosphite was employed as the added compound and also when pure diethylene glycol dihexylene glycol diphosphite was used as the added compound.

The amount of added compound can vary from 1 to 4 parts per 100 parts of vinyl chloride resin.

What is claimed is:

1. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and a stabilizing amount of compound having the formula:

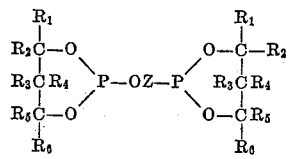

where $R_1$, $R_2$, $R_3$, $R_4$, $R_5$ and $R_6$ are selected from the group consisting of hydrogen and lower alkyl groups and Z is selected from the group consisting of

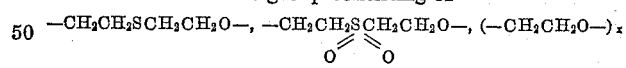

and

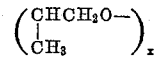

where $x$ is an integer of at least 2.

2. A stabilized composition according to claim 1 where Z is $(CH_2CH_2O)_x$.

3. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and

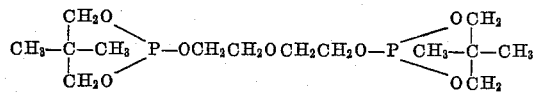

in an amount sufficient to stabilize the resin.

4. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and

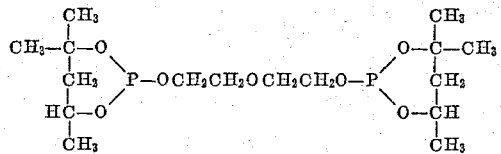

in an amount sufficient to stabilize the resin.

5. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and

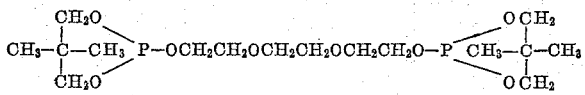

in an amount sufficient to stabilize the resin.

6. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and

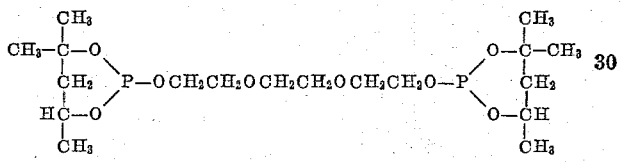

in an amount sufficient to stabilize the resin.

7. A composition according to claim 1 wherein the halogen containing resin is a vinyl chloride resin.

8. A composition according to claim 7 wherein Z is $(CH_2CH_2O)_x$.

9. A composition according to claim 3 wherein the halogen containing resin is a vinyl chloride resin.

10. A composition according to claim 4 wherein the halogen containing resin is a vinyl chloride resin.

11. A composition according to claim 5 wherein the halogen containing resin is a vinyl chloride resin.

12. A composition according to claim 6 wherein the halogen containing resin is a vinyl chloride resin.

13. A stabilized composition according to claim 1 wherein the halogen containing resin is a vinyl chloride resin and said composition includes a metal salt stabilizer for the vinyl chloride resin in amount of 0.1 to 10 parts per 100 parts of the resin.

14. A stabilized composition comprising a halogen containing resin, said resin being selected from the group consisting of a homopolymer of a vinylidene group containing halogen compound and a copolymer of such a vinylidene group containing halogen compound with another vinylidene group containing compound, and

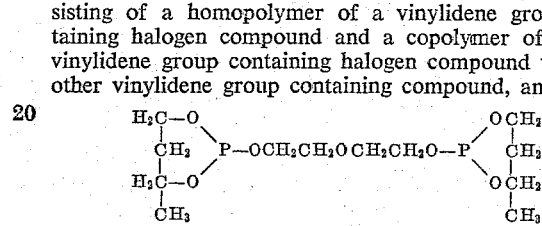

in an amount sufficient to stabilize the resin.

15. A composition according to claim 14 wherein the halogen containing resin is a vinyl chloride resin.

References Cited in the file of this patent

UNITED STATES PATENTS

| | | |
|---|---|---|
| 2,234,379 | Martin | Mar. 11, 1941 |
| 2,834,798 | Hechenbleikner et al. | May 13, 1958 |
| 2,841,608 | Hechenbleikner et al. | July 1, 1958 |
| 2,916,508 | McConnell | Dec. 8, 1959 |
| 3,047,608 | Friedman et al. | July 31, 1962 |
| 3,056,824 | Hecker et al. | Oct. 2, 1962 |